(12) United States Patent
Barringer

(10) Patent No.: US 7,002,350 B1
(45) Date of Patent: *Feb. 21, 2006

(54) MARINE OIL AND GAS EXPLORATION SYSTEM USING TELLURIC CURRENTS AS A NATURAL ELECTROMAGNATIC ENERGY SOURCE

(75) Inventor: Anthony R. Barringer, Golden, CO (US)

(73) Assignee: Telluric Exploration, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/992,520

(22) Filed: Nov. 17, 2004

Related U.S. Application Data

(60) Provisional application No. 60/524,020, filed on Nov. 19, 2003.

(51) Int. Cl.
*G01V 3/15* (2006.01)
*G01V 3/08* (2006.01)
(52) U.S. Cl. ...................... 324/350; 324/365
(58) Field of Classification Search ............... 324/345, 324/348, 349, 350, 365, 330–331; 343/709, 343/719; 244/1 TD
See application file for complete search history.

(56) References Cited

U.S. PATENT DOCUMENTS 4,507,611 A * 3/1985 Helms ......................... 324/323
4,686,475 A * 8/1987 Kober et al. ................. 324/349
4,835,473 A * 5/1989 Bostick, Jr. .................. 324/357
6,191,587 B1 * 2/2001 Fox ............................. 324/350

* cited by examiner

*Primary Examiner*—Jay Patidar
(74) *Attorney, Agent, or Firm*—Edwin H. Crabtree; Ramon L. Pizarro

(57) ABSTRACT

A marine oil and gas exploration system used for measuring telluric currents as a natural electromagnetic energy source flowing beneath an ocean and sea floor. The marine exploration system includes a towed fish adapted for being pulled behind a survey ship. The coordinates of the ship and the towed fish can be controlled by a GPS satellite and time data. The fish includes an aerodynamic waterproof housing, somewhat reminiscent of a shape of a fish. Metal sheet electrodes of electric field sensors are mounted on the surface of a tubular nose extending outwardly from the housing. The electric field sensors are in direct contact with the sea water. Typically, the fish is towed approximately 100 feet above the sea floor. The positioning of the fish is maintained by the use of an acoustic "pinger" on the fish. The pinger transmits signals up a towed cable to the survey ship. The fish can also include a cesium magnetometer connected to the electric field sensors. The magnetometer provides for detecting low frequency magnetic components of the electromagnetic fields generated by the telluric currents flowing under the sea floor. A filtering of the magnetic component signals is used to provide a phase and amplitude references for the electric fields. The amplitudes of the electric field at each frequency are ratioed against the amplitudes of similarly filtered components of the magnetometer.

14 Claims, 6 Drawing Sheets

Marine Electro-Telluric
Oil Exploration System

Design of 'fish' carrying sensors.

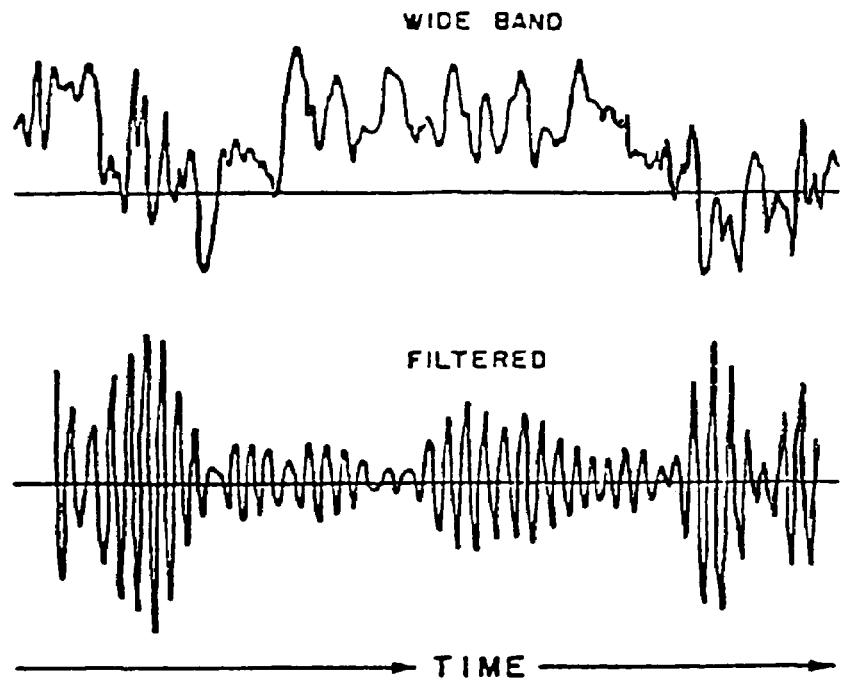
FIG. 1 Magnetic and telluric field data before and after filtering.
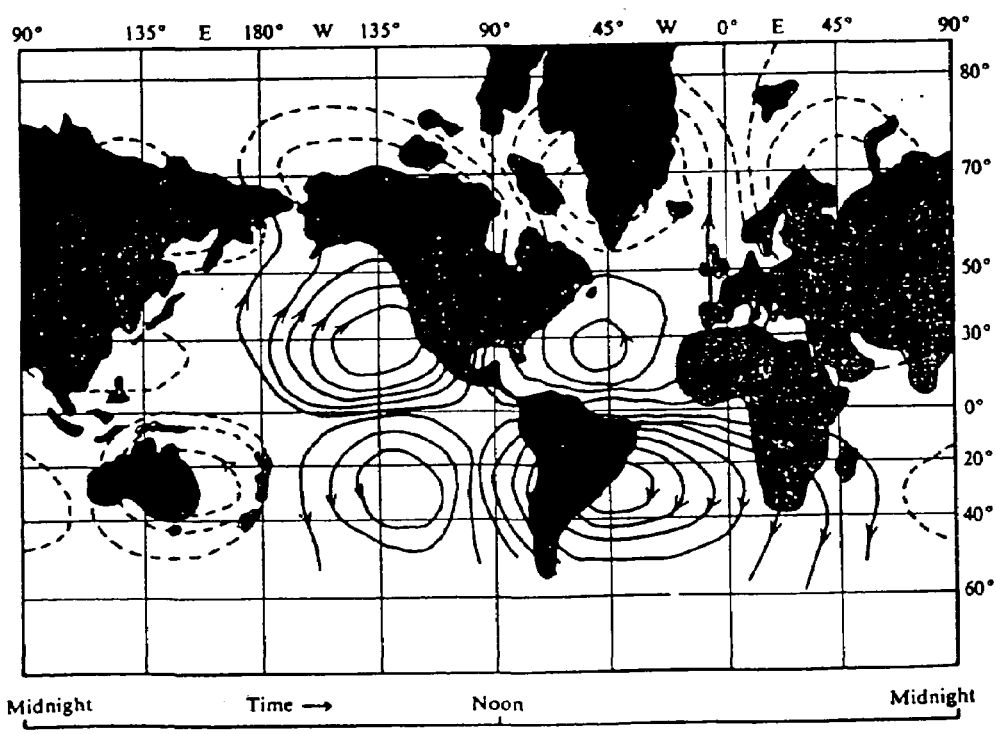
FIG. 2 Worldwide telluric-current system. (After Dobrin, 1950)

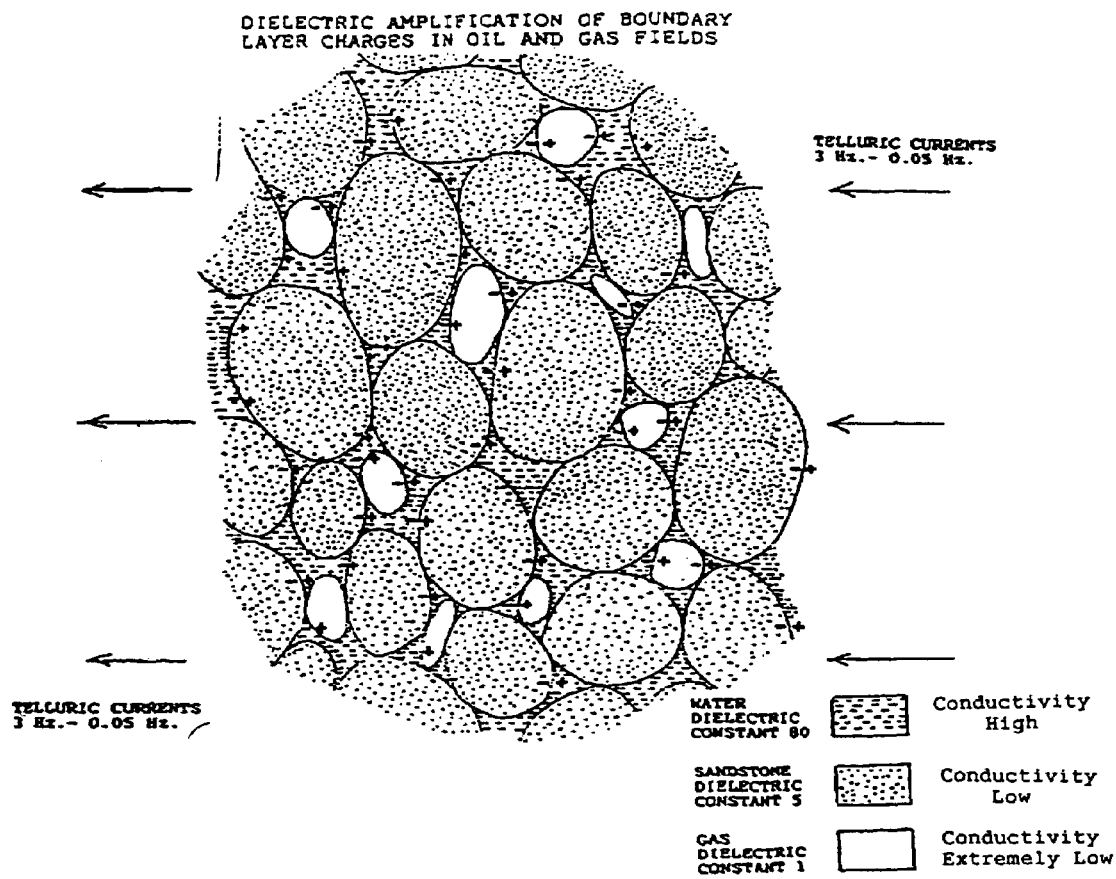
FIG. 3 Alternating charges developed by Telluric Currents flowing through Oil & Gas Reservoirs

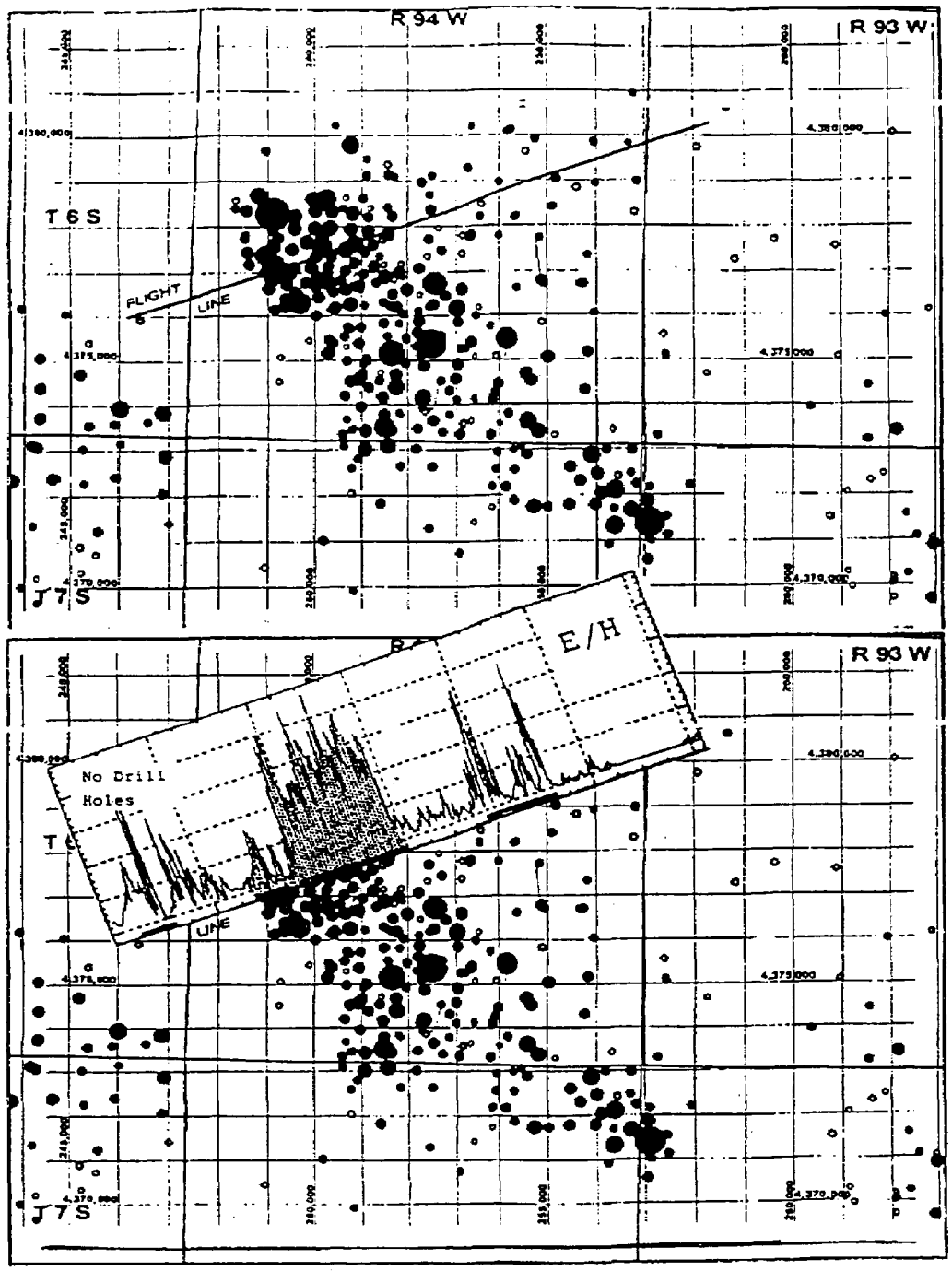
FIG. 4 Flight Line with an airborne version Of the invention across a Major Gas Field. (Rulison Field, Colorado)

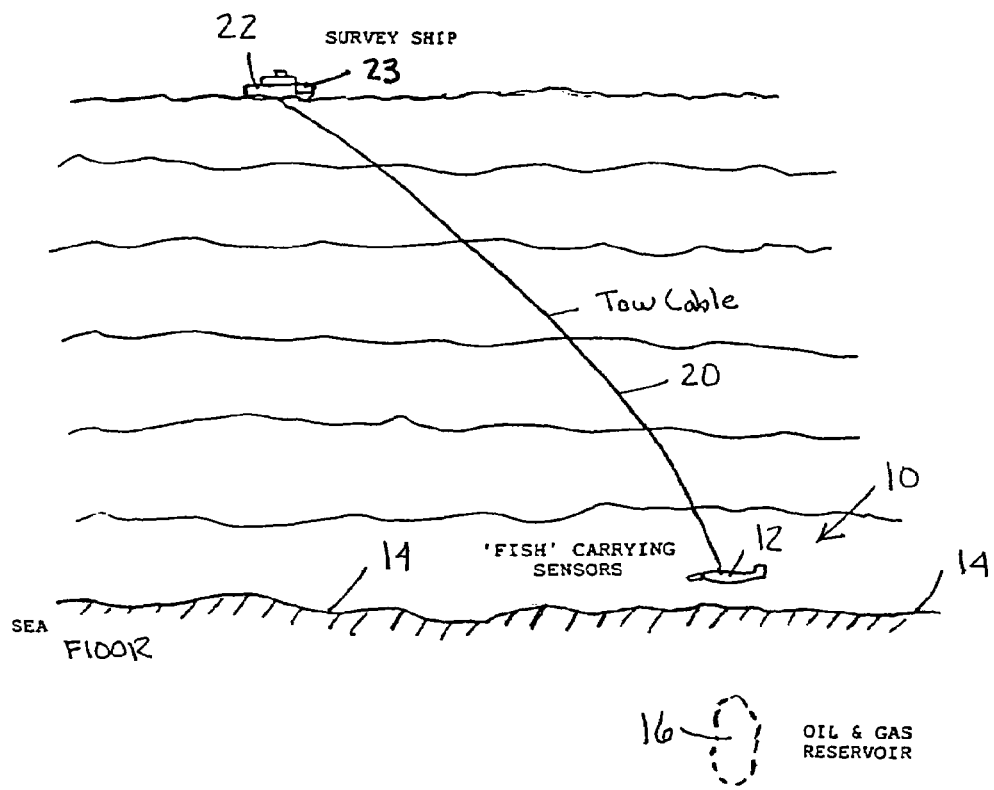
FIG. 5 Marine Electro-Telluric Oil Exploration System

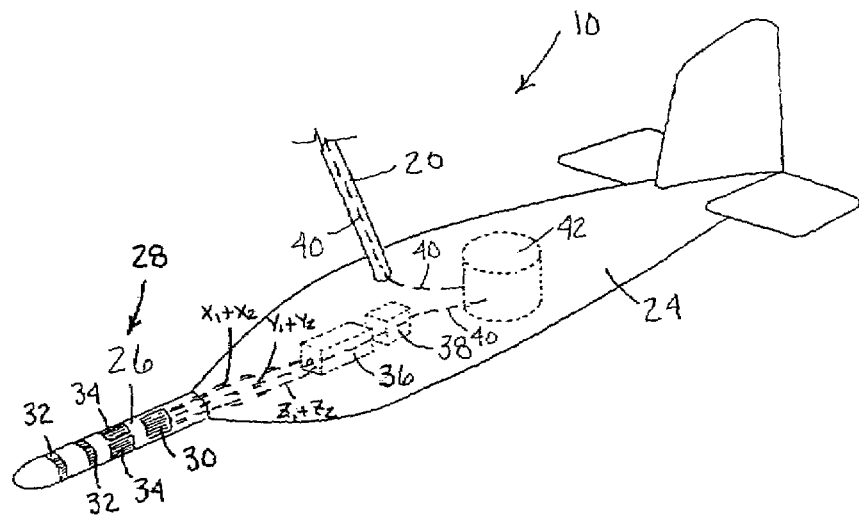
FIG. 6. Design of 'fish' carrying sensors.
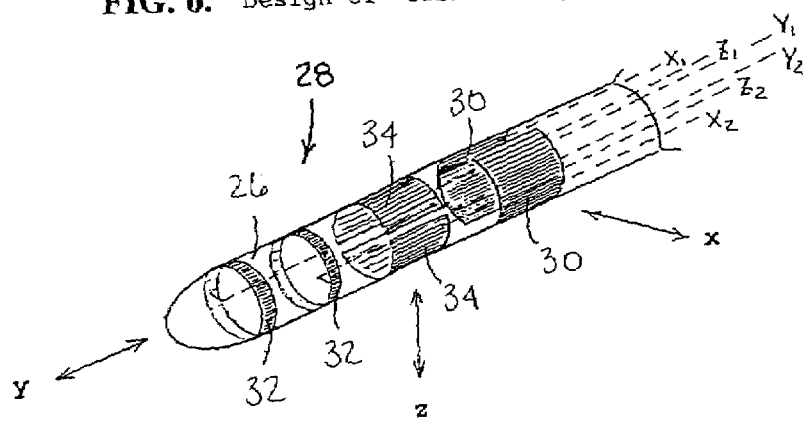
FIG. 7 Detail on Electric Field Sensors on 'fish'

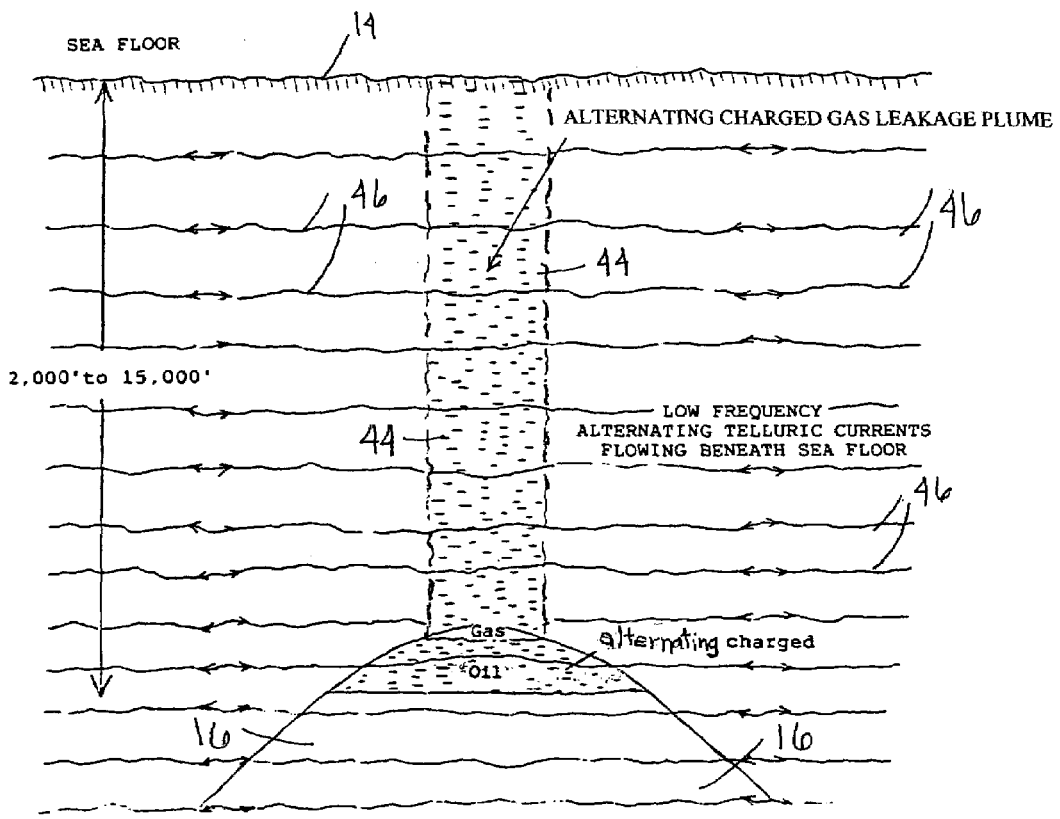
FIG. 8  Oil Reservoir below sea floor and associated Leakage Plume.

MARINE OIL AND GAS EXPLORATION SYSTEM USING TELLURIC CURRENTS AS A NATURAL ELECTROMAGNATIC ENERGY SOURCE

This application is based on a provisional patent application filed in the U.S. Patent and Trademark Office on Nov. 19, 2003 having Ser. No. 60/524,020 by the subject inventor.

BACKGROUND OF THE INVENTION (a) Field of the Invention

The subject invention relates to a marine exploration system and more particularly, but not by way of limitation, to a marine exploration system using a ship with a towed "fish". The fish used for measuring telluric currents as a natural electromagnetic energy source flowing beneath an ocean or sea floor.

(b) Discussion of the Prior Art

Heretofore, ground and airborne electromagnetic systems have been in use for natural resource exploration from about 1950 onwards. These systems depend mainly upon the measurement of the magnetic and conductive properties of the underlying ground. Airborne magnetic survey systems, that employ magnetometers with advanced stages of development, provide very satisfactory results. However, airborne conductivity measurements of the underlying terrain made with airborne electromagnetic systems that currently exist, leave a great deal of room for improvement.

Electromagnetic systems typically operate at a minimum terrain clearance with respect to safety and employ electromagnetic transmitters operating in the frequency range from about 20 Hz. to 50 kHz with limited ground penetration. The ground currents and their related secondary magnetic fields as induced in the underlying ground by these transmissions are detected by receiving coils mounted in a tail boom on an aircraft or in an airborne survey bird towed behind the aircraft. Either fixed wing aircraft or helicopters are used for these surveys. The response from the underlying ground is related to it's conductivity and the depth of penetration of the transmitted fields. The latter is primarily a function of the frequency employed and the field strength of the electromagnetic field that is generated by the equipment. Typical maximum penetrations are in a range of 400 to 1000 ft.

The only exception to the above description was an airborne system known as "AFMAG" that was developed by S. H. Ward and others in the 1960's. (S. H. Ward et al. AFMAG-Applications and Limitations. Geophysics, Vol. XXXI, No. 3 (June 1966), pp. 576–605.) This system utilized the natural electromagnetic fields generated by lightning events occurring in distant electrical storms. These storms can provide a source for electromagnetic energizing of the ground, primarily in the frequency range of 20 Hz. to 500 Hz. Useable frequencies down to about 3 Hz. exist but high quality receiving coils and coil anti-vibration mountings are required for the lower frequencies. These were apparently not available in the AFMAG system.

Although the AFMAG system showed some promise, it did not achieve sufficient commercial acceptance to survive for more than a short period. Amongst the various problems of the system was the absence of the sophisticated instrumentation and digital data acquisition and processing systems that were not available at that time. Also and very importantly, there was a lack of adequate technology for suppressing the prime sources of noise, such as angular vibration of the detection coils in the presence of a strong magnetic field in the earth. The latter is associated with a motor generator effect that can detect a millionth of a degree of angular vibration.

The AFMAG system was also restricted to the use of audio frequency fields and did not employ extremely low frequency and much more powerful natural magnetotelluric fields, as used in the present invention. Just as importantly, the AFMAG system as well as all other airborne electromagnetic systems, past or present, did not make use of the valuable data available in the electric field components of electromagnetic fields.

The subject marine exploration system demonstrates that electric field data, as measured by methods that do not make contact with an ocean or sea floor, can be more important than the magnetic component of electromagnetic fields. Experience with the invention has also shown that, for specific reasons, the measuring of the electric field data is particularly valuable at frequencies below 3 Hz. This type of information is completely missing in the old AFMAG system as well as current marine, ground and airborne electromagnetic systems. The field data lies in the range of frequencies from 0.01 Hz. to 3 Hz. and is used in the present invention for the marine detection of an induced polarization phenomena. Also, related response of dielectric interfacial polarization effects can be detected over oil and gas fields. These low frequency polarization effects, which are particularly important in the electric fields, are discussed herein.

In U.S. Pat. No. 6,765,383 issued to the subject inventor, a magnetotelluric geophysical survey system is described using an aircraft survey bird. The survey system uses natural electromagnetic EM fields as an energy source. The system includes the survey bird with electric dipoles, an angular motion detector and an airborne data recording system. The subject marine exploration survey system described herein is similar to the survey system described in U.S. Pat. No. 6,765,383 and provides a unique marine exploration system using a combination of non-contact electric field EM techniques for oil and gas exploration under an ocean and sea floor.

The marine exploration system is dependent upon certain effects associated with a deep flow of natural telluric currents in a frequency range of 0.01 to 3 Hz. These currents are induced in the earth by an action of magnetotelluric (MT) fields. These MT fields are well known and are generated by the interaction of solar wind with the outer reaches of the earth's magnetic field. The solar wind is a stream of positively charged particles that are emitted by the sun. The MT fields that are relevant to the subject exploration system cover a frequency range from approximately 30 Hz down to 0.01 Hz and lower. These MT fields increase progressively in field strength with decreasing frequency, which is a fact that provides for penetrations into an ocean and sea floor at frequencies of 1 Hz. and lower down to depths of 10,000 feet and deeper.

SUMMARY OF THE INVENTION

A primary object of the subject invention is to provide a unique marine exploration survey system using a combination of non-contact electric field techniques for deep exploration employing natural telluric currents as an energy source. The system operates in a frequency range from 0.01 Hz to 3.0 Hz. The telluric currents are induced within the earth by the action of magnetotelluric (MT) fields.

Another object of the marine exploration system is develop both deep and shallow ocean and sea exploration information induced by polarization effects or dielectric polarization effects related to oil and gas.

Still another object of the exploration system is to operate offshore with a survey ship and a towed fish exploring and surveying ground depths of 10,000 feet or more below the ocean and sea floor.

Yet another object of the marine exploration system is through it's use, exploration costs are greatly reduced when compared to current offshore oil and gas exploration systems using a seismic ship with elaborate installations and a towed array of marine geophones. The use of the subject system is close to direct detection of oil and gas and greatly improves the odds of detecting a new underwater oil and gas field.

The subject marine exploration system includes a towed fish adapted for being pulled behind a survey ship. The coordinates of the ship and the towed fish can be controlled by a GPS satellite and time data. The fish is a streamlined waterproof container, somewhat reminiscent of a shape of a fish. Metal sheet electrodes of electric field sensors are mounted on the surface of a tubular nose of the fish. The electric field sensors are in direct contact with the sea water. Typically, the fish is towed approximately 100 feet above the sea floor. The positioning of the fish is maintained by the use of an acoustic "pinger" on the fish. The pinger transmits signals up a towed cable to the survey ship. The fish can also include a cesium magnetometer connected to the electric field sensors. The magnetometer provides for detecting low frequency magnetic components of the electromagnetic fields generated by the telluric currents flowing under the sea floor. A filtering of the magnetic component signals is used to provide a phase and amplitude references for the electric fields. The amplitudes of the electric field at each frequency are ratioed against the amplitudes of similarly filtered components of the magnetometer.

These and other objects of the present invention will become apparent to those familiar with marine, ground, and airborne geophysical oil and gas survey systems when reviewing the following detailed description, showing novel construction, combination and elements as described herein, and more particularly defined by the claims, it being understood that changes in the embodiments in the disclosed invention are meant to be included as coming within the scope of the claims, except insofar as they may be precluded by the prior art.

BRIEF DESCRIPTION OF THE DRAWINGS

FIG. 1 illustrates magnetic and telluric field data before and after frequency filtering.

FIG. 2 is a world map illustrating the flow of telluric currents in the oceans and seas of the world and across land masses.

FIG. 3 illustrates charges developed by telluric currents flowing through an oil and gas reservoir and showing dielectric interfacial boundary charges at boundaries of sandstone grains, water and gas.

FIG. 4 illustrates the response of an airborne exploration system flown across a major, deep-seated gas field, Rulison Gasfield, Piceance Basin, Colo.

FIG. 5 illustrates the subject marine exploration system with a survey ship with tow cable pulling a towed fish disposed above an ocean and sea floor. The fish is shown disposed directly above an oil and gas reservoir below the sea floor.

FIG. 6 is a perspective view of the towed fish with an outwardly extending tubular nose carrying electric field sensors.

FIG. 7 is a perspective view of the electrical wiring connections to dipoles making up the field sensor mounted on the tubular nose shown in FIG. 6.

FIG. 8 illustrates an oil reservoir below a sea floor and showing an associated negatively charged gas leakage plume and low frequency alternating telluric currents flowing beneath the ocean and sea floor.

DESCRIPTION OF THE PREFERRED EMBODIMENTS

In FIG. 1, magnetic and telluric field data is shown before and after frequency filtering of a wide frequency band and the same frequency band filtered.

In FIG. 2, a world map is shown illustrating a flow of telluric currents in the oceans and seas of the world and also across land masses in the northern and southern hemispheres.

In FIG. 3, illustrates charges developed by telluric currents flowing through an oil and gas reservoir and showing dielectric interfacial boundary charges at boundaries of sandstone grains, water and gas. It is extremely important to note that the electric fields detected by the marine exploration system described herein are associated with the dielectric charge effects at hydrocarbon/water contacts as shown in this drawing. The hydrocarbon/water contacts exhibit very high contrast in both dielectric constant and conductivity giving rise to electric charges in the presence of telluric currents. These currents are shown as arrows and are extremely strong at very low frequencies. The telluric currents are induced by magnetotelluric fields and are measured in a 0.01 to 3 Hz range by the dipoles and magnetometers as discussed above.

In FIG. 4, an example of the type of data acquired in a flight across a major gas field is shown. The field is the Rulison Gas Field, Piceance Basin, Colo. The data was obtained by dividing the electric field response (E) by the magnetic field response (H). The highly directional response of the field is due to the presence of oriented fractures that make the field productive.

In FIG. 5, the subject marine exploration system is shown having numeral 10. The system 10 includes a towed fish 12 disposed above a sea floor 14. The fish 12 is shown in this drawing disposed directly above an oil and gas reservoir 16 below the sea floor 14. The towed fish 12 is connected to a tow cable 20 attached to and pulled behind a survey ship 22.

In FIG. 6, a perspective view of the towed fish 12 is shown with an aerodynamic waterproof housing 24 and an outwardly extending tubular nose 26. The tubular nose 26 includes an electric field sensor, having general reference numeral 28. The electric field sensor 28 includes three orthogonal dipoles 30, 32 and 34. The field sensor and dipoles are shown more clearly in FIG. 7. The housing 24 and tubular nose 26 are designed to minimize drag as it is pulled underwater at various depths. The sensor 28 is used in association with a 3-axis angular motion detector 36 installed in the fish housing 24. The motion detector 36 is based on the use of vibrating quartz tuning forks and has an angular sensitivity of 0.003 degrees. The motion detector 36 is fully adequate for use in compensating for noise produced by the angular motions of the electric field sensor 28 in the presence of the telluric currents from the sea and under the sea floor 14.

An optically pumped cesium vapor magnetometer 38 is mounted inside the housing 24 and electrically connected to the motion detector 36 via electric lead 40. Also, the magnetometer 38 can be connected to a data processing unit 42 via the electric lead 40 in the housing 24. Optionally, the data processing unit 42 can be installed on the survey ship 22 for gathering the signals and data from the fish 12 via the electric lead 40. GPS time and location recording equipment 23, mounted on the survey ship 22, is electrically connected to the data processing unit 42 for allowing synchronization of the data as to phase and amplitude references of magnetic field data and electric field data surveyed.

The magnetometer 38 has a sensitivity of 1 picoTesla and provides a very sensitive measurement of the magnetotelluric fields. However, the sensitivity of the magnetometer 38 lies in a direction of the earth's magnetic field. Therefore, the MT frequency measurements are made in this direction. But, the derivative of the output of the magnetometer 38 provides data that is proportional to a horizontal gradient of the MT fields. The use of the optically pumped magnetometer 38 in the subject marine exploration system 10 has two important applications. The first is the magnetometer's immunity to noise from angular motions encountered when towed underwater and the second is the high sensitivity and stability of the magnetometer 38.

Also, the magnetometer 38 provides a critical function of detecting low frequency magnetic components of the electromagnetic fields generated by the telluric currents flowing beneath the sea floor. The filtered components of these signals are used as a phase and amplitude reference of the electric fields measured by the dipoles 30, 32 and 34. The electric field data from the dipoles is presented as a set of selected frequencies in each of the orthogonal directions along the X axis, Y axis and Z axis, shown in FIG. 7. The amplitudes of the electric field at each frequency are ratioed against the amplitude of the similarly filtered components of the magnetometer 38. These amplitudes of the magnetic field are then resolved in the direction of the earth's magnetic field, which has operationally been proven to provide a very convenient and satisfactory reference.

The above mentioned procedure of using the ratio of the electric fields against the magnetic fields automatically compensates for fluctuation in the field strengths of the MT fields. This is due to the fact that the MT fields are the source of the telluric currents. Therefore, the telluric currents track these fluctuations.

In FIG. 7, a perspective view of the electrical wiring connections to dipoles is shown making up the field sensor 28 mounted in the tubular nose 26. The X dipole 30, disposed along the X axis is connected to electric leads X1 and X2. The Y dipole 32, disposed along the Y axis is connected to electric leads Y1 and Y2. The Z dipole 34, disposed along the Z axis is connected to electric leads Z1 and Z2. The electric leads are all connected to the motion detector 36. The electric field sensor 28 and the magnetometer 38 are designed to operate below 30 Hz. and more specifically in a range of 0.01 to 3 Hz and less.

In should be mentioned that lower natural field frequencies, termed magnetotelluric (MT) fields, cover a typical range of 0.01 Hz to 3 Hz. As mentioned above, the MT fields originate from an interaction between the solar wind and the outer reaches of the earth's magnetic field into space. The field strength of these fields increases by factor of 100 times from 1 Hz down to 0.1 Hz and about 1000 times down to 0.05 Hz. These very strong and extremely low frequency fields can provide penetrations down to 10,000 feet and deeper below the sea floor, which makes them uniquely effective for oil and gas exploration.

In FIG. 8, an enlarged view of the oil and gas reservoir 16 below the sea floor 14 is illustrated. In this drawing, a negatively charged gas leakage plume 44 is shown moving upwardly through 2000 to 15,000 feet below the sea floor 14. Also shown in this drawing are a plurality of low frequency alternating telluric currents 46 flowing underground and beneath the sea floor 14.

While the invention has been particularly shown, described and illustrated in detail with reference to the preferred embodiments and modifications thereof, it should be understood by those skilled in the art that equivalent changes in form and detail may be made without departing from the true spirit and scope of the invention as claimed except as precluded by the prior art.

The embodiments of the invention for which as exclusive privilege and property right is claimed are defined as follows:

1. A marine survey system for exploration of oil and gas, the survey system using natural telluric currents as an energy source, the survey system attached to a tow cable connected to a survey ship, the system comprising:
   a towed fish adapted for attachment to the tow cable, said towed fish including a waterproof housing and an outwardly extending tubular nose;
   an electric field sensor mounted on said tubular nose, said electric field sensor including electric dipoles mounted thereon, said electric dipoles measuring electric fields at 30 Hz and less;
   an angular motion detector mounted inside said housing and connected to said electric dipoles for compensating for errors caused by angular motion of said towed fish when in the presence of strong electric field gradients from the telluric currents; and
   a magnetometer mounted inside said housing for measuring low frequency electromagnetic fields at 30 Hz and less, said magnetometer connected to said motion detector.

2. The system as described in claim 1 further including a data processing unit mounted in said housing and connected to said electric dipoles for receiving and storing electric field data measurements, said data processing unit also connected to said angular motion detector for receiving and storing angular motion measurements and connected to said magnetometer for storing magnetic field data measurements.

3. The survey system as described in claim 2 further including a GPS time and location reference connected to said data processing unit for allowing synchronization of data as to phase and amplitude references of magnetic field data and electric field data surveyed.

4. The survey system as described in claim 1 wherein said electric dipoles include a first dipole for taking data measurements in a horizontal X axis perpendicular to a length of said fish, a second dipole for taking data measurements in a horizontal Y axis parallel to the length of said fish and a third dipole for taking data measurements in a vertical Z axis perpendicular to the length of said fish.

5. The survey system as described in claim 1 wherein said electric dipoles measure electric fields in a range of 0.01 to 3 Hz.

6. The survey system as described in claim 1 wherein said magnetometer measures magnetic fields in a frequency range of 0.01 to 3 Hz.

7. A marine survey system for exploration of oil and gas, the survey system using natural telluric currents as an energy source, the survey system attached to a tow cable connected to a survey ship, the system comprising:
   a towed fish adapted for attachment to the tow cable, said towed fish including a waterproof housing and an outwardly extending tubular nose;

an electric field sensor mounted on said tubular nose, said field sensor including electric dipoles mounted thereon, said electric dipoles measuring electric fields in a frequency range from 0.01 Hz. to 3 Hz.;

an angular motion detector mounted inside said housing and connected to said electric dipoles for compensating for errors caused by angular motion of said towed fish when in the presence of strong electric field gradients from the telluric currents;

a magnetometer mounted inside said housing for measuring low frequency electromagnetic fields in a frequency rang from 0.01 Hz to 3 Hz, said magnetometer connected to said motion detector; and a data processing unit mounted in said housing and connected to said electric dipoles for receiving and storing electric field data measurements from said electric dipoles, said data processing unit also connected to said angular motion detector for receiving and storing angular motion measurement and connected to said magnetometer for storing magnetic field data measurements.

8. The survey system as described in claim 7 further including GPS time and location recording equipment mounted on the survey ship and electrically connected to said data processing unit for receiving of electric field and magnetic field data measurements from said data processing unit.

9. The survey system as described in claim 7 wherein said magnetometer is an optically pumped cesium vapor magnetometer connected to said motion detector.

10. The survey system as described in claim 7 wherein said angular motion detector includes a vibrating quartz tuning fork with an angular sensitivity of 0.0003 degrees.

11. A marine survey system for exploration of oil and gas, the survey system using natural telluric currents as an energy source, the survey system attached to a tow cable connected to a survey ship, the system comprising:

a towed fish adapted for attachment to the tow cable, said towed fish including a waterproof housing and an outwardly extending tubular nose;

a field sensor mounted on said tubular nose, said field sensor including electric dipoles mounted thereon, said electric dipoles measuring electric fields in a frequency range from 30 Hz. and less;

an angular motion detector mounted inside said housing and connected to said electric dipoles for compensating for errors caused by angular motion of said towed fish when in the presence of strong electric field gradients from the telluric currents;

a magnetometer mounted inside said housing for measuring low frequency magnetic fields in a frequency range from 30 Hz and less, said magnetometer connected to said motion detector; and a data processing unit mounted in said housing and connected to said electric dipoles for receiving and storing electric field data measurements from said electric dipoles, said data processing unit also connected to said angular motion detector for receiving and storing angular motion measurement and connected to said magnetometer for storing magnetic field data measurements;

whereby said magnetometer provides a critical function of detecting low frequency magnetic components of the electromagnetic fields generated by the telluric currents flowing beneath the sea floor, the magnetic components are used as a phase and amplitude reference of the electric fields measured by said electric dipoles, the electric field data from said electric dipoles presented as a set of selected frequencies in each of orthogonal directions along an X axis, Y axis and Z axis, the amplitudes of the electric field at each frequency are ratioed against the amplitudes of similar magnetic components from said magnetometer, the amplitudes of the magnetic field are then resolved in the direction of the earth's magnetic field.

12. The survey system as described in claim 11 further including a GPS time and location reference connected to said data processing unit for allowing synchronization of data as to phase and amplitude references of magnetic field data and electric field data surveyed.

13. The survey system as described in claim 11 wherein said electric dipoles measure electric fields in a range of 0.01 to 3 Hz.

14. The survey system as described in claim 11 wherein said magnetometer measures magnetic fields in a frequency range of 0.01 to 3 Hz.

* * * * *